(12) United States Patent
Inamoto (10) Patent No.: US 6,236,753 B1
(45) Date of Patent: May 22, 2001

(54) APPARATUS AND METHOD FOR DISPLAYING CONTOUR LINES AND CONTOUR LINE DISPLAY APPARATUS CONTROL PROGRAM STORED MEDIUM

(75) Inventor: Ken Inamoto, Tondabayashi (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/176,107

(22) Filed: Oct. 21, 1998

(30) Foreign Application Priority Data

Oct. 21, 1997 (JP) .................................................. 9-288733

(51) Int. Cl.⁷ ...................................................... G06K 9/00
(52) U.S. Cl. .............................................................. 382/189
(58) Field of Search .................................. 382/189, 190, 382/191, 192, 193, 194, 195, 199, 209, 256, 186, 187, 315, 316

(56) References Cited

U.S. PATENT DOCUMENTS

| | | |
|---|---|---|
| 4,639,720 | 1/1987 | Rympalski et al. . |
| 4,998,213 * | 3/1991 | Susuki et al. .......................... 364/519 |
| 5,434,959 | 7/1995 | Von Ehr, II et al. . |
| 5,509,113 | 4/1996 | Takakura et al. . |
| 5,524,189 | 6/1996 | Hayama . |
| 5,596,692 | 1/1997 | Martin et al. . |
| 5,687,259 * | 11/1997 | Linford ................................. 382/294 |
| 5,748,769 * | 5/1998 | Nishimura et al. ................... 382/159 |

FOREIGN PATENT DOCUMENTS

| | | |
|---|---|---|
| 58-172768 | 10/1983 | (JP) . |
| 3-75973 | 3/1991 | (JP) . |
| 8-146939 | 6/1996 | (JP) . |

* cited by examiner

*Primary Examiner*—Andrew W. Johns
*Assistant Examiner*—Seyed H. Azarian
(74) *Attorney, Agent, or Firm*—Nixon & Vanderhye P.C.

(57) ABSTRACT

An object of the present invention is to draw contour lines according to specified display coordinates and display the lines immediately. In order to achieve this object, a display rectangular coordinate system and an input rectangular coordinate system that correspond to each other are set up for a display face of a liquid crystal display unit and for an input face of a tablet. If an input coordinate is specified on the input face using a predetermined directing device, therefore, a tablet control unit outputs hand-written input coordinate data and corresponding display coordinates are specified. Then, a central control unit creates contour data representing contour lines which enclose the figure composed of the specified coordinate data, on the basis of the data according to control of programs read from a floppy disk and stored in a ROM. In other words, the central control unit generates first figure data composed of specified coordinate data, then generates second figure data including the first figure data and representing contour lines which enclose the figure composed of the data thereby to create contour data obtained by removing the first figure data from the second figure data. The created contour data is then displayed on the liquid crystal display unit.

9 Claims, 9 Drawing Sheets

APPARATUS AND METHOD FOR DISPLAYING CONTOUR LINES AND CONTOUR LINE DISPLAY APPARATUS CONTROL PROGRAM STORED MEDIUM

BACKGROUND OF THE INVENTION

1. Field of the Invention

The present invention relates to a display apparatus which allows hand-written graphic characters of, for example, a letter, a figure, etc. to be entered, more particularly to an apparatus and method for displaying contour lines of a figure, which displays contour lines of a hand-written graphic character created by contouring processing carried out immediately after the hand-written graphic character is entered, as well as a medium on which a program for controlling the apparatus is stored.

2. Description of the Related Art

Related art technologies for drawing contour lines of a graphic character stored beforehand is disclosed in Japanese Unexamined Patent Publications JP-A 58-172768 (1983), JP-A 3-75973 (1991), and JP-A 8-146939 (1996). In JP-A 58-172768 (1983), contour lines of graphic characters stored beforehand are created and displayed by setting a rectangular coordinate system in which each coordinate axis is inclined by 45° to a display rectangular coordinate system set up for the display face beforehand. Consequently, the line width of the contour line in the oblique direction becomes equal to the line widths of the graphic character in both vertical and horizontal directions. The corners of the contour line are thus rounded.

Furthermore, in JP-A 3-75973, both starting and ending points of a stroke are found, then regular polygons inscribing circles drawn around the starting and ending points assumed as center points are found, and after this, a stroke figure inscribing both of the regular polygons, that is, a contour line is found. In addition, in JP-A 8-146939, an original letter stored beforehand is drawn so as to be contoured with a contoured letter. It is possible to specify a width and angle for shifting the contoured letter, as well as a color for the contoured letter.

The related art described above is also used for contouring processing for all of coordinate data representing a graphic character to be contoured. The contouring processing is possible only after all the coordinate data of the graphic character is entered. Consequently, when a curve or the like is drawn freely using a pointing device on digital image data, it is impossible to contour the curve in real time. For example, in the case of a display apparatus which allows hand-written graphic characters of letters, figures, etc. to be entered, it is impossible to display contour lines of the hand-written graphic characters immediately. Additionally the operator cannot confirm the contour lines during contouring processing.

SUMMARY OF THE INVENTION

Under such circumstances, it is an object of the present invention to provide an apparatus and method for displaying an image with contour lines of the figure serviceably, as well as a medium on which a control program is stored.

In a first aspect of the invention there is provides an apparatus for displaying contour lines of a figure comprising:

displaying device having a display face for which a predetermined rectangular coordinate system is set up;

inputting device for specifying coordinates in the rectangular coordinate system of the displaying device to output coordinate data; and contour data creating circuit for accumulating and fetching coordinate data outputted from the inputting device from a time of beginning of output to create contour data representing contour lines which enclose the figure composed of the coordinate data, on the basis of the accumulated coordinate data, wherein the contour lines of the figure, composed of the contour data are displayed on the displaying device.

According to the first aspect of the invention, when coordinates are specified in the rectangular coordinate system set up for the display face of the displaying device, contour lines according to the specified coordinates can be displayed. In other words, when coordinates are specified, the coordinate data representing the specified coordinates is outputted and accumulated. On the basis of the accumulated coordinate data, contour data is created. The contour data represents contour lines which enclose the figure composed of the coordinate data. Consequently, in a display apparatus which allows hand-written graphic characters of a letter, a figure, etc. to be entered, immediately after a hand-written graphic character is entered, the graphic character is contoured and displayed. In addition, it is possible to confirm the contour lines while the contouring processing is performed. The convenience of the apparatus is thus improved significantly.

In a second aspect of the invention the contour data creating circuit includes:

first figure generating circuit for generating the first figure data composed of the accumulated coordinate data;

first storing circuit for storing the first figure data;

second figure generating circuit for generating the second figure data including the first figure data and representing the second figure which encloses the first figure composed of the first figure data;

second storing circuit for storing the second figure data; and synthesizing circuit for synthesizing contour data obtained by removing the first figure data from the second figure data.

According to the second aspect of the invention, when coordinates are specified, the coordinate data representing the specified coordinates is outputted and accumulated, so that contour data is created on the basis of the accumulated coordinate data. At this time, the first figure data composed of the accumulated coordinate data is generated and stored in the first storing circuit. Then the second figure data including the first figure data and representing contour lines which enclose the figure composed of the first figure data is generated and stored in the second storing circuit. In addition, the first figure data is removed from the second figure data, thereby contour data is synthesized. After this, contour lines are displayed.

In a third aspect of the invention, there is provided a method for displaying contour lines of a figure, comprising the steps of:

specifying coordinates in a predetermined rectangular coordinate system set up for the display face of the displaying device thereby to output the coordinate data of the specified coordinates;

accumulating the outputted coordinate data from a time of beginning of output and creating contour data representing contour lines which enclose the figure composed of the coordinate data on the basis of the coordinate data; and displaying the contour lines composed of the contour data.

According to the third aspect of the invention, it is possible to provide a method for displaying contour lines, which is applicable to the apparatus described in the first aspect of the invention.

In a fourth aspect of the invention the step for creating contour data includes the steps of:

generating and storing the first figure data composed of the accumulated coordinate data;

generating and storing the second figure data including the first figure data and representing a second figure which encloses a first figure composed of the first figure data; and removing the first figure data from the second figure data thereby to synthesize contour data.

According to the fourth aspect of the invention, it is possible to provide a method for displaying contour lines, which is applicable to the apparatus described in the second aspect of the invention.

In a fifth aspect of the invention there is provided a medium in which a program for controlling the contour line display apparatus described above by a computer is stored, the program comprising specifying coordinates in a predetermined rectangular coordinate system set up for the display face of the displaying device thereby to output the coordinate data; accumulating the outputted coordinate data from a time of the beginning of the output; creating contour data representing contour lines which enclose the figure composed of the coordinate data on the basis of the coordinate data, and displaying the contour lines composed of the contour data on the displaying device.

According to the fifth aspect of the invention, it is possible to provide a medium usable for the apparatus described in the first aspect of the invention, that is, a medium storing a program for controlling the contour line display apparatus.

In a sixth aspect of the invention the control program generates and stores first figure data composed of the accumulated coordinate data, then generates and stores second figure data including the first figure data and representing a second figure which encloses a first figure composed of the first figure data, and removes the first figure data from the second figure data thereby to synthesize contour data, by a computer.

According to the sixth aspect of the invention, it is possible to provide a recording medium applicable to the apparatus described in the second aspect of the invention, that is, a medium on which a program for controlling the contour line display apparatus is stored.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Now referring to the drawings, preferred embodiments of the invention are described below.

Figure 1:
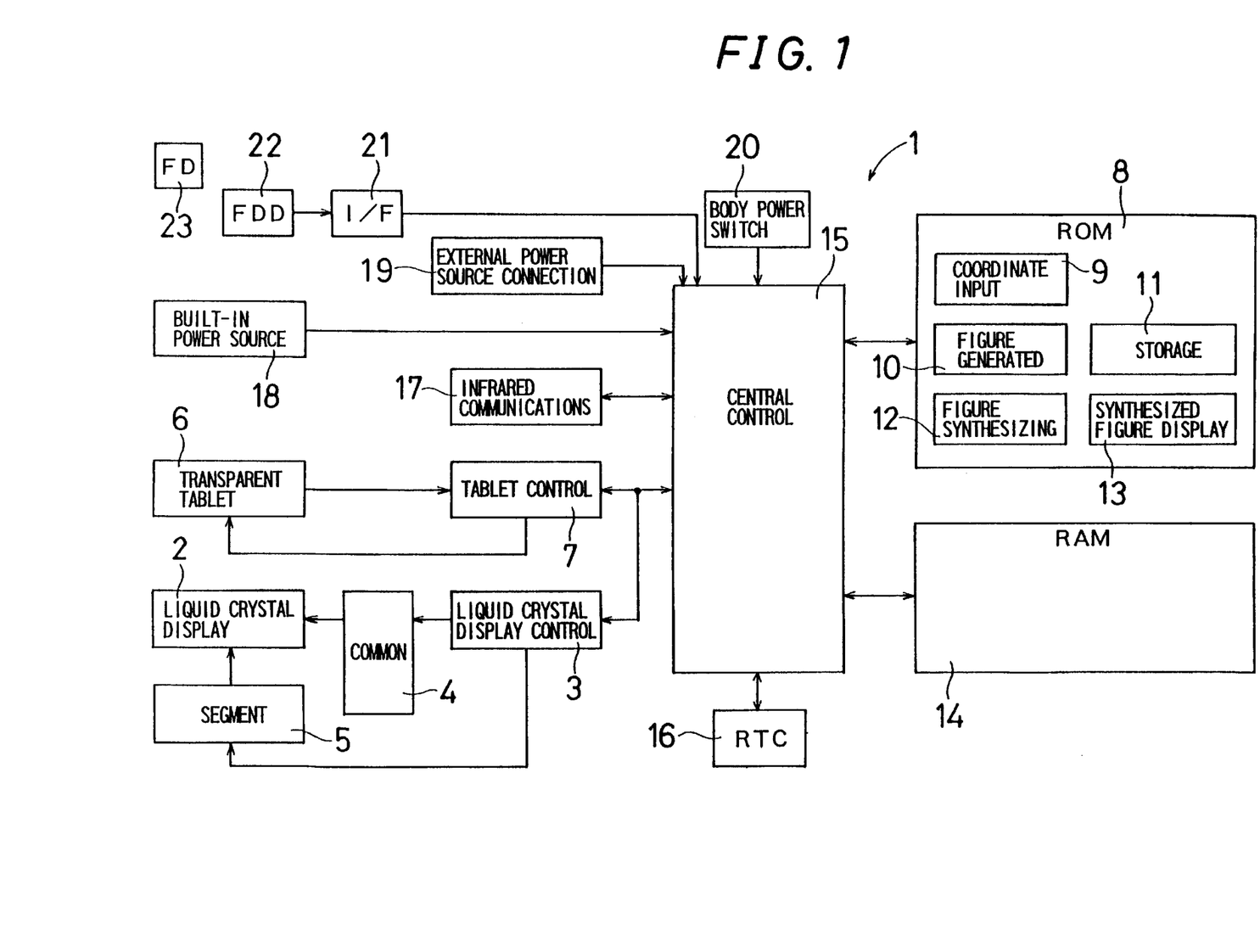
FIG. 1 is a block diagram for an electrical configuration of an apparatus 1 for displaying contour lines of a figure in an embodiment of the present invention.
Figure 2:
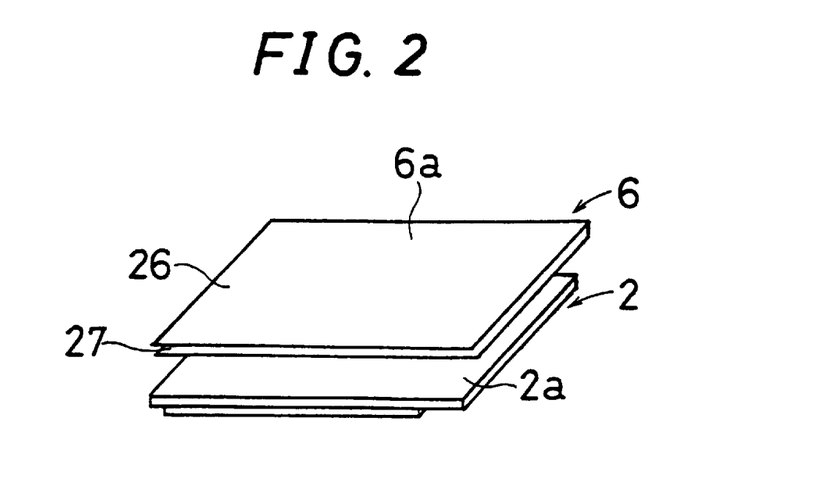
FIG. 2 is a perspective view indicating a liquid crystal display unit 2 and a tablet 6 of the contour line display apparatus 1.
Figure 3:
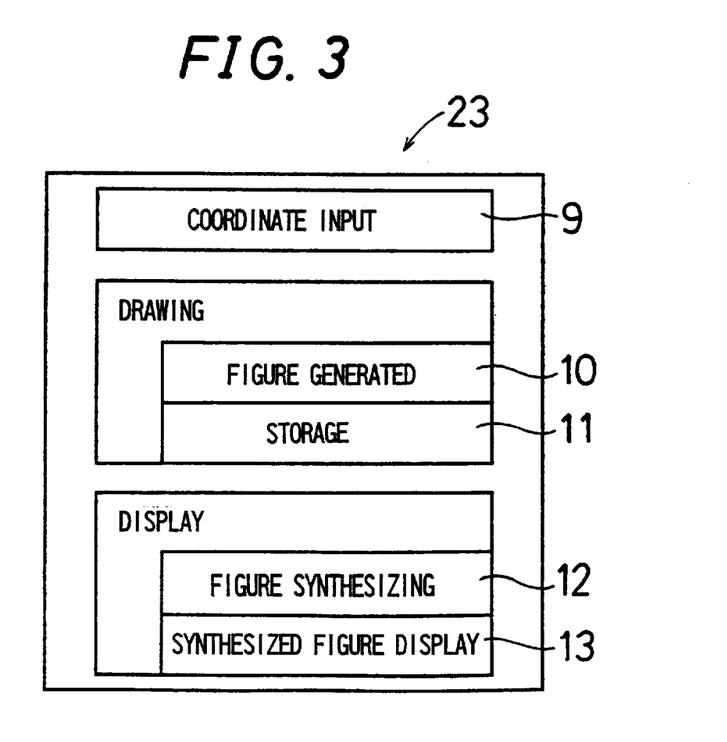
FIG. 3 is a configuration of a floppy disk 23 storing control programs for the contour line display apparatus 1.
Figure 4:
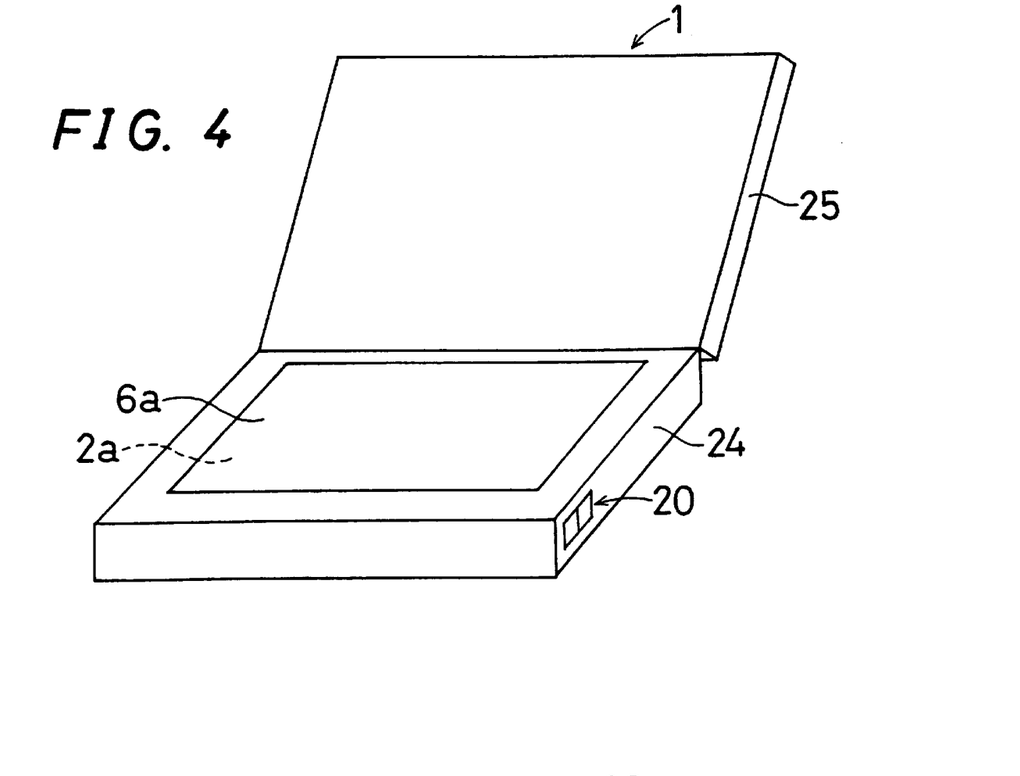
FIG. 4 is a perspective view indicating an external appearance of the contour line display apparatus 1.

FIG. 1 is a block diagram of an electrical configuration of the contour line display apparatus 1 in an embodiment of the present invention. FIG. 2 is a perspective view for a liquid crystal display unit 2 and a tablet 6 of the contour line display apparatus 1. FIG. 3 is a configuration of a floppy disk 23. FIG. 4 is a perspective view for an external appearance of the contour line display apparatus 1.

The contour line display apparatus 1 is provided with a liquid crystal display unit 2 used as displaying device. The liquid crystal display unit 2 is a thin matrix display type one. The display unit 2 has a constitution of well-known art and is provided with a display face 2a for which a predetermined rectangular coordinate system is set up. Pixels are disposed in a matrix-like pattern along the rectangular coordinate system. Each pixel is composed of a pair of electrodes disposed so as to hold the liquid crystal therebetween. A liquid crystal display control unit 3 stores positions of pixels to which display signals are given as a bit map. The control unit 3 controls the display by restricting the state of the liquid crystal orientation with display signals given to each pair of electrodes of the liquid crystal display unit 2 via a common circuit 4 and a segment circuit 5. A back light composed of an EL (Electroluminescence) panel may be provided on the back side of the liquid crystal display unit 2.

The contour line display apparatus 1 is also provided with a tablet 6 used as inputting device. The tablet 6 has a constitution of a well-known technology and is provided with a transparent input face 6a for which a hand-written input rectangular coordinate system is set up corresponding to the display rectangular coordinate system. Concretely, the transparent tablet 6 is composed of two transparent sheet-like members 26 and 27 opposed to each other and transparent electrodes are provided along the input rectangular coordinate system inside each of the sheet-like members 26 and 27. Each transparent electrode is usually protected by small projection-like spacers printed at regular pitches from coming in contact with each other. Those electrodes come in contact with each other when an operator enters hand-written graphic characters of letters, figures, etc. by touching the input face 6a with a finger of the operator or a predetermined input pen, etc. Consequently, the tablet 6 outputs the coordinate data representing the touched coordinate point. A tablet control unit 7 is connected to each transparent electrode and detects coordinate data. Since the display rectangular coordinate system and the input rectangular coordinate system correspond to each other, when an input coordinate point is designated on the tablet 6, a display coordinate point corresponding to the input coordinate point can be specified.

The contour line display apparatus 1 is also provided with a ROM (Read Only Memory) 8, a RAM (Random Access Memory) 14, and a central control unit 15. The ROM 8 stores a coordinate input program 9 used to specify a display coordinate point, as well as drawing and displaying programs. The drawing program includes a figure generating program 10 and a storing program 11. The figure generating program 10 is used to generate figures for displaying contour lines according to specified display coordinates, the figures being different in width from each other. The storing program 11 is used to store a generated figure in a buffer of the RAM 14. The displaying program is composed of a figure synthesizing program 12 and a synthesized figure displaying program 13. The program 12 is used to synthesize figures stored in the storage buffer according to a predetermined priority and the program 13 is used to display such a synthesized figure. On the floppy disk 23 are stored programs 9 to 13, etc. beforehand. The floppy disk drive 22 reads a program stored on the floppy disk 23. The read program is entered to and stored in the ROM 8 and the RAM 14 respectively via an I/F (inter face) unit 21.

The central control unit 15 composed of, for example, a CPU (central processing unit) reads a program stored in the ROM 8 and in the RAM 14 thereby to control the operation of the contour line display apparatus 1 generally. At this time, the RAM 14 may be used as a processing area for storing data temporarily. Especially, in the case of the contour line display apparatus 1 in this embodiment, contour data representing contour lines which enclose the figure composed of specified display coordinate data is created according to programs 9 to 13 on the basis of the data and displayed on the liquid crystal display unit 2.

The contour line display apparatus 1 is also provided with an RTC (Real Time Clock) 16, an infrared communication unit 17, a built-in power source 18, an external power source connector 19, and a body power switch 20. The RTC 16 counts the clock on the basis of a predetermined clock signal and outputs the current date (day, month, and year data) and time. The infrared communication unit 17 has an infrared terminal used for data communications with external devices such as a personal computer, etc. so as to receive and transmit data signals from and to external devices. The built-in power source 18 is a DC (direct current) power source provided as a battery and a battery pack, for example. The external power source connector 19 has a connecting terminal for use in connection with an AC (Alternate Current) power source adapter, etc. Supplied a driving voltage from an external power source connected to the built-in power source 18 or an external power source connector 19, the body power switch 20 is turned on/off to turn on/off the voltage.

The contour line display apparatus 1 is roughly divided into a main body cabinet portion 24 and a cover portion 25. The input face 6a is almost the same as the display face 2a in size. The input face 6a is disposed so as to be put on top of the display face 2a. The liquid crystal display unit 2 and the tablet 6 are united into one. The main body cabinet portion 24 is constructed so that both display face 2a and input face 6a are exposed and the transmitter and receiver used to transmit and receive predetermined data signals to and from the infrared communication unit 17 are exposed. When an input pen is used, an input pen holder is provided to the main body cabinet portion 24. Inside the main body cabinet portion 24 are incorporated the electric components described above. The cover portion 25 is connected to one side of the main body cabinet portion 24 using hinges. The cover portion 25 is composed rotationally so as to come close to and be separated from the display face 2a and the input face 6a. When in transportation, the display face 2a and the input face 6a are covered and protected by the cover portion 25. The power switch 20 is provided on one side of the main body cabinet portion 24.

Figure 5A:
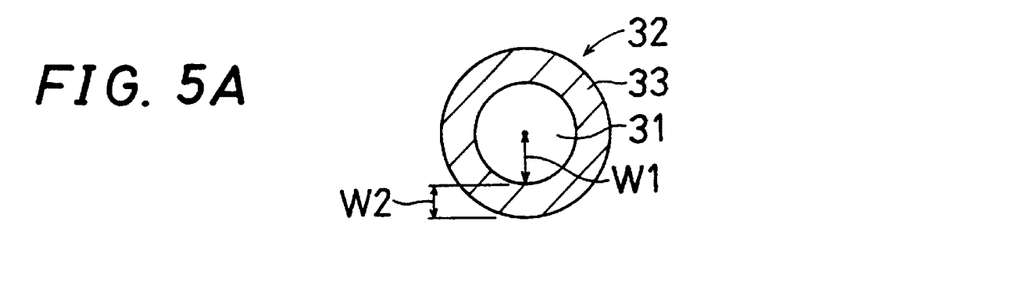
FIGS. 5A and 5B are views illustrating a synthesized FIG. 33, respectively.
Figure 5B:
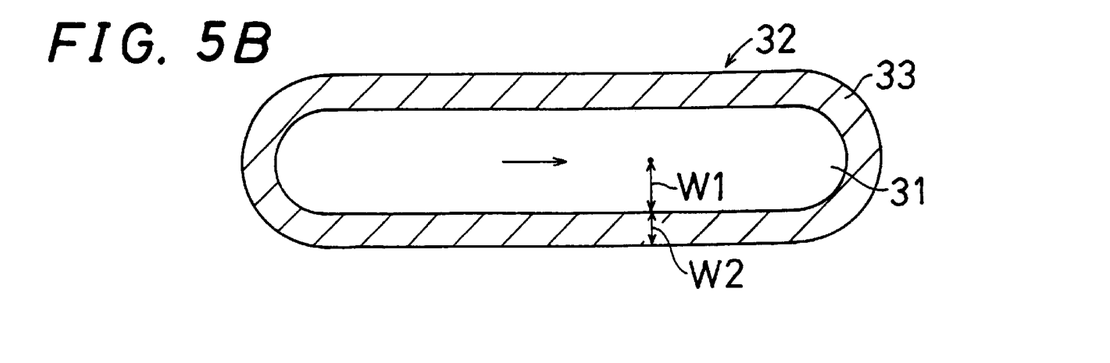

FIGS. 5A and 5B illustrate a synthesized figure (a contour line area (obliquely striped portion)) 33 respectively. On the basis of the specified display coordinate data, a synthesized FIG. 33 which encloses a figure composed of the data is created. Concretely, on the basis of the figure generating program 10, two data items are generated from specified display coordinate data; one data item represents a hand-written input FIG. 31 having a width W1 and the other data item represents a contoured FIG. 32 including the hand-written input FIG. 31 and having a width W1+W2. The data items which represent those FIGS. 31 and 32 are stored in the storage buffer according to the storing program 11 and synthesized at a predetermined priority on the basis of the figure synthesizing program 12. In other words, the FIG. 31 is removed from the FIG. 32 thereby to compose a FIG. 33. The synthesized FIG. 33 is then displayed on the liquid crystal display unit 2 under the control of the synthesized figure displaying program 13.

The width W1 of the hand-written input FIG. 31 is equal to the width of a figure displayed in a predetermined color when the hand-written input graphic character is displayed without contouring processing. The contour line display apparatus 1 in this embodiment contours the periphery of such a hand-written input FIG. 31 and displays the figure in a predetermined color. In this embodiment, a series of hand-written input and specified display coordinate data items are accumulated and contouring processing is performed for the accumulated display coordinate data items. Thus, it is possible to contour the periphery of the hand-written input FIG. 31 completely not only when a hand-written input graphic character is a point-like one as shown in FIG. 5A, but also when the graphic character is a line-like one formed with consecutive points as shown in FIG. 5B.

Figure 6A:
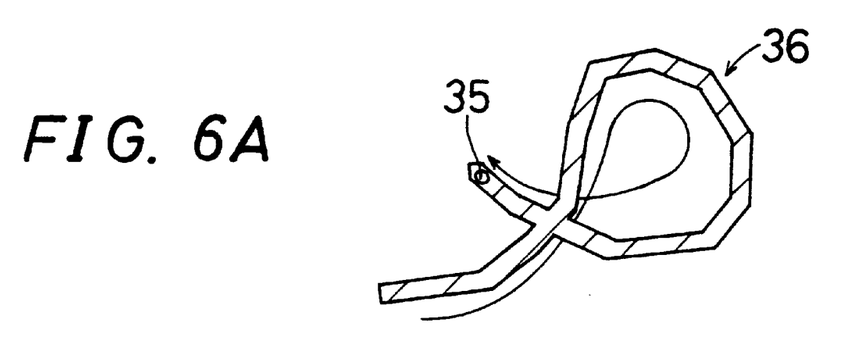
FIGS. 6A and 6B are views illustrating FIGS. 36 and 33 for which contour processing is carried out, respectively.
Figure 6B:
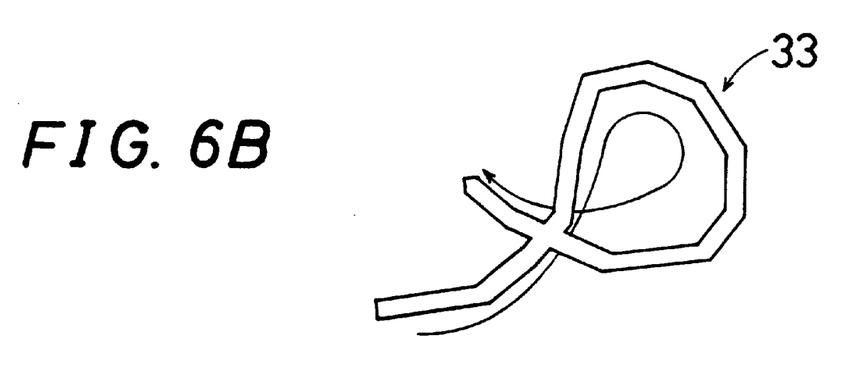

In other words, when contouring processing is performed for each coordinate of the display coordinate data specified by hand-written input, the contour areas are put on top of each other. Thus, only the last coordinate point 35 is contoured actually as shown in FIG. 6A and the coordinate points put before the point 35 are all included in the FIG. 36 in which contour areas are put on top of each other. In this embodiment, however, specified display coordinate data items are accumulated and each of those accumulated coordinate data items is contoured. As a result, a contoured synthesized FIG. 33 is created, where the peripheries of the consecutive hand-written input figures are contoured completely as shown in FIG. 6B.

Figure 7:
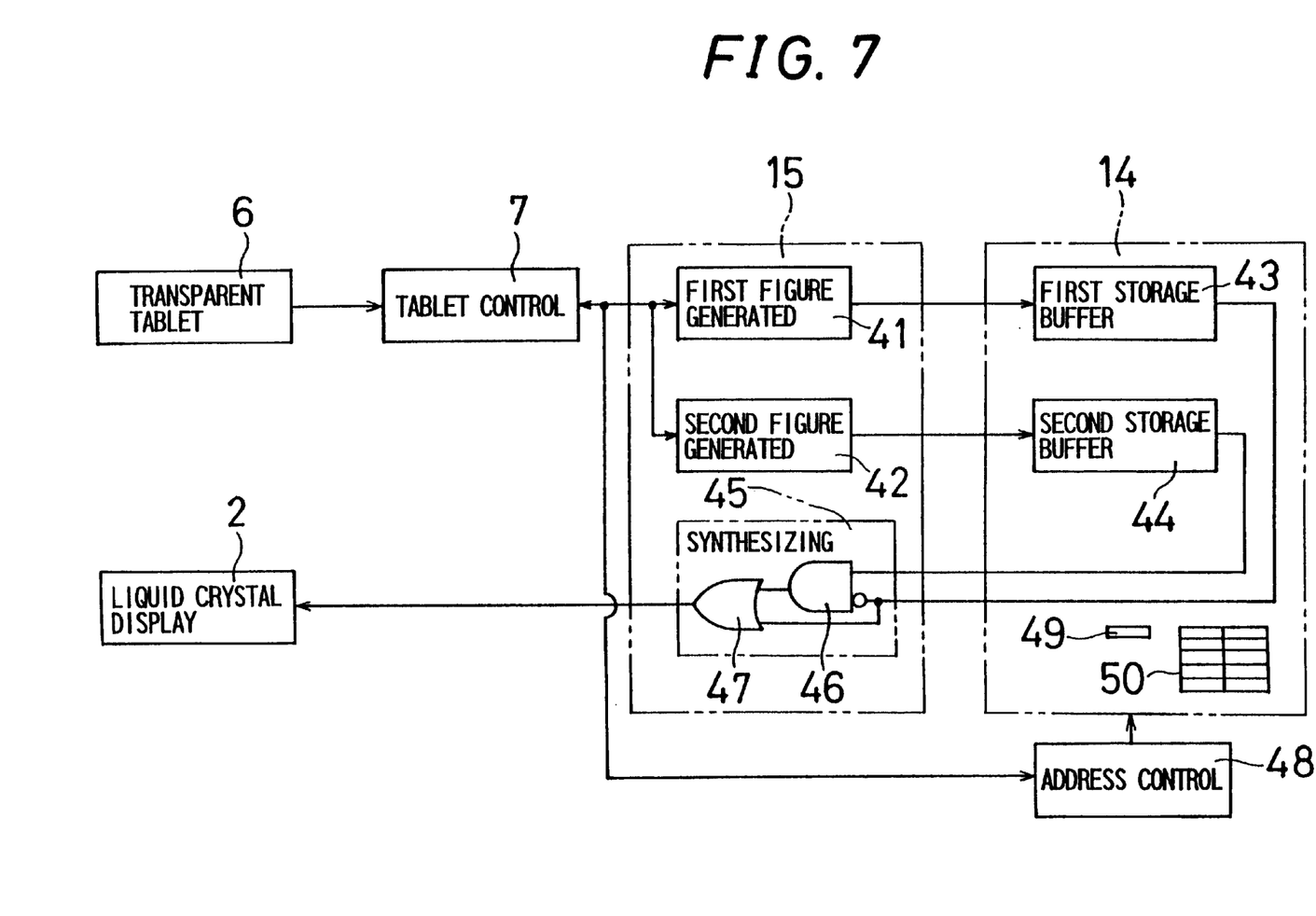
FIG. 7 is a detailed block diagram for the configuration of a central control unit 15 and a RAM 14.

FIG. 7 is a detailed block diagram of the configurations of the central control unit 15 and the RAM 14. When a hand-written input character is entered to the input face 6a of the tablet 6, the output of the tablet 6 is converted to coordinate data in the tablet control unit 7 and outputted to both first figure generator 41 and second figure generator 42 of the central control unit 15. The first figure generator 41 operates under the control of the figure generating program 10 and generates data for representing the first figure having a width W1. The figure is displayed at a display coordinate point corresponding to the hand-written input coordinate point. The second figure generator 42 also operates under the control of the figure generating program 10 and generates data for representing the second figure having a width W1+W2. The figure is displayed at a display coordinate point corresponding to the hand-written input coordinate point.

The RAM 14 is provided with the first storage buffer 43 and the second storage buffer 44. The first storage buffer 43 operates under the control of the storing program 11 and stores the first figure data. The second storage buffer 44 also operates under the control of the storing program 11 and stores the second figure data.

The contour line display apparatus 1 also includes an address control unit 48. The address control unit 48 accesses storage addresses of the first and second storage buffers 43 and 44 on the basis of the coordinate data from the tablet control unit 7. The first and second storage buffers 43 and 44 have a storage capacity equal to an amount of dot information that can be displayed on the liquid crystal display unit 2 respectively. The first and second figure data items stored in the storage buffers 43 and 44 are synthesized as to be described later, then displayed at a corresponding display point on the liquid crystal display unit 2.

The central control unit 15 operates under the control of the figure synthesizing program 12 and it is provided with a synthesizer 45 used to synthesize the first figure data stored in the first storage buffer 43 with the second figure data stored in the second storage buffer 44. The synthesizer 45 reads figure data stored in the storage buffers 43 and 44, which are generated and stored at the same hand-written data input after they are accessed by the address control unit 48 concurrently. The synthesizer 45 is provided with an AND circuit 46 and an OR circuit 47. The AND circuit 46 outputs synthesized figure data which represents a synthesized figure when reverse data of the first figure data, which is read bit information, and the second figure data, which is read bit information, are entered together. The OR circuit 47 outputs at least any one of the synthesized figure data and the read first figure data so as to be displayed on the liquid crystal display unit 2.

In other words, when the bit information indicating a display is read from the first storage buffer 43, the bit information is reversed and entered to one terminal of the AND circuit 46, so that it is inhibited to output data from the AND circuit 46 regardless of the content of the bit information read from the second storage buffer 44, which is to be entered to the other terminal of the AND circuit 46. In addition, when the bit information indicating a display is not read from the first storage buffer 43, the bit information from the second storage buffer 44, which is to be entered to the AND circuit 46, is outputted as is.

Figure 8:
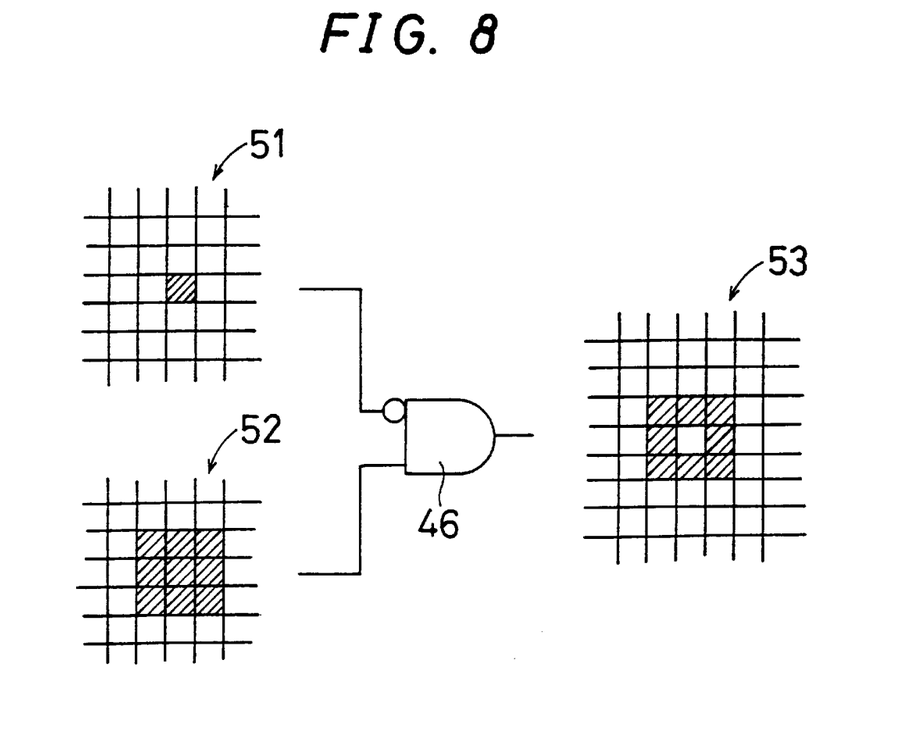
FIG. 8 is a view for describing how to create synthesized figure data.
Figure 9:
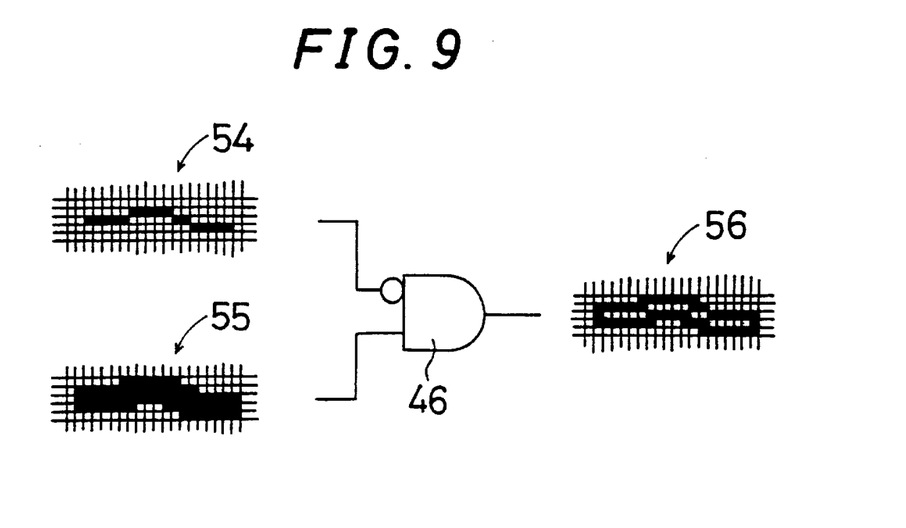
FIG. 9 is a view for describing how to create synthesized figure data.

FIGS. 8 and 9 illustrate how to create synthesized figure data. At first, description will be made for a case when a hand-written graphic character is entered like a point on the input face 6a of the tablet 6 with reference to FIG. 8. The first figure data 51 stored in the first storage buffer 43 represents display coordinates (striped portion) corresponding to hand-written input coordinates of one point. The second figure data 52 stored in the second storage buffer 44, which includes the first figure data 51, represents a plurality of display coordinates (9 coordinates in this embodiment) (striped areas) enclosing the data 51. Since the reversed data of the first figure data 51 and the second figure data 52 are entered to the AND circuit 46, the output from the AND circuit 46 becomes synthesized figure data 53 obtained by removing the first figure data 51 from the second figure data 52.

Next, description will be made for a case when handwritten graphic characters are entered like a line on the input face 6a of the tablet 6 with reference to FIG. 9. The first and second figure generators 41 and 42 perform figure generating processing for accumulated coordinate data respectively. Thus, the first figure data 54 stored in the first storage buffer 43 represents a plurality of consecutive display coordinates (striped portions) corresponding to a plurality of consecutive hand-written input coordinates. The second figure data 55 stored in the second storage buffer 44 includes the first figure data 54 and represents a plurality of display coordinates (striped regions) enclosing the data 54. Since the reversed data of the first figure data 54 and the second figure data 55 are entered to the AND circuit 46, the output from the AND circuit 46 becomes synthesized figure data 56 obtained by removing the first figure data 54 from the second figure data 55.

When displaying data in a color with reference to FIG. 7, the RAM 14 is provided with a color storage 49 used to hold color information preset as additional information of the first figure data stored in the first storage buffer 43. The RAM 14 is also provided with an complementary color storage table 50 storing the relationship among complementary colors. The RAM 14 outputs a complementary color of the color stored in the color storage 49 as additional information of the second figure data stored in the second storage buffer 44. These additional information items, as well as each figure data are entered to the AND circuit 46 and the OR circuit 47. Consequently, the first figure data can be represented by a color stored in the color storage 49. Synthesized figure data can also be displayed in a complementary color of the first figure.

Figure 10:
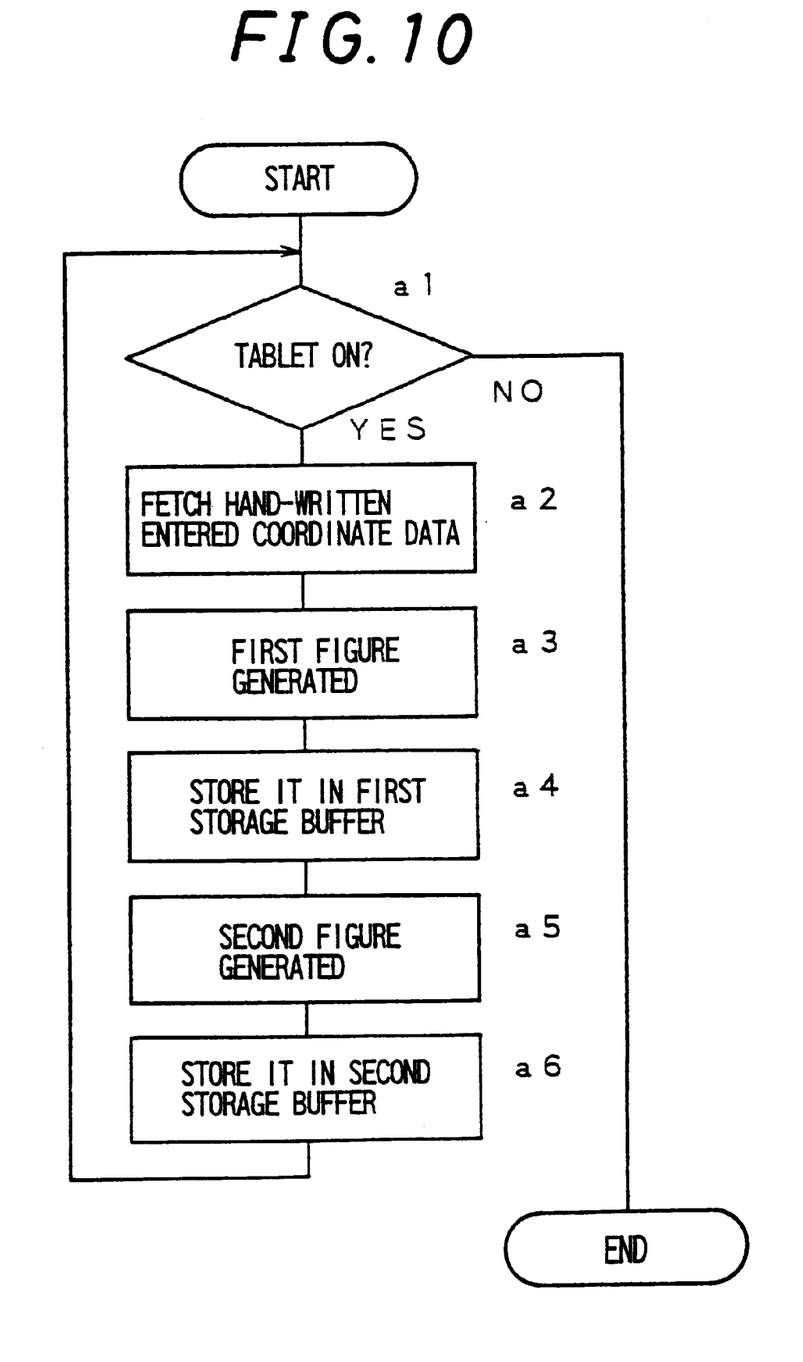
FIG. 10 is a flow chart indicating an operation of the central control unit 15 for creating the first and second figure data.

FIG. 10 is a flow chart indicating an operation of the central control unit 15 for creating the first and second figure data. When any hand-written data is entered on the tablet 6 and it is detected in step a1, control goes to step a2 where the coordinate data is fetched via the tablet control unit 7. Then, the first figure generator 41 generates the first figure data having a width W1 in step a3 and the data is stored in the first storage buffer 43 of the RAM 14 in step a4. And then, the second figure generator 42 generates the second figure data having a width of W1+W2 in step a5 and the data is stored in the second storage buffer 44 of the RAM 14 in step a6. When the operation in step a6 is ended, control returns to step a1. If no hand-written data is entered on the tablet 6 in step a1 at this time, the operation is ended. The operations in step a1 to a6 are repeated to accumulate coordinate data kept outputted from the beginning of the hand-written data input. According to the accumulated coordinate data, the whole line-like graphic character can be contoured.

Figure 11:
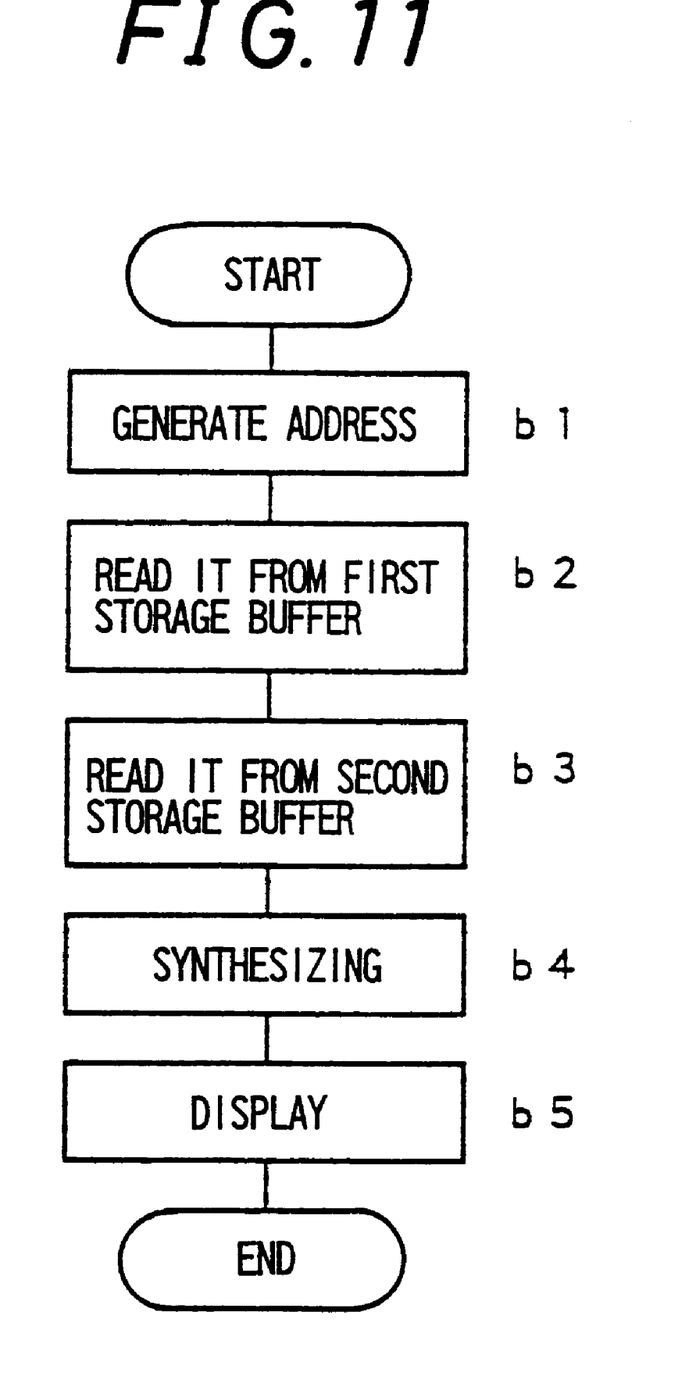
FIG. 11 is a flow chart indicating of an operation of the central control unit 15 for synthesizing the first and second figure data and displaying the synthesized figure data.

FIG. 11 is a flow chart indicating an operation of the central control unit 15 for synthesizing the first and second figure data and displaying the synthesized figure data. In step b1, the address of figure data to be synthesized and displayed is generated. Then, the storage buffer 43 is accessed on the basis of the generated address in step b2 to read the first figure data stored there. Furthermore, the storage buffer 44 is accessed on the basis of the generated address in step b3 to read the second figure data stored there. Then, the read first and second figure data are synthesized in the synthesizer 45 in step b4 and displayed on the liquid crystal display unit 2 in step b5.

Figure 12:
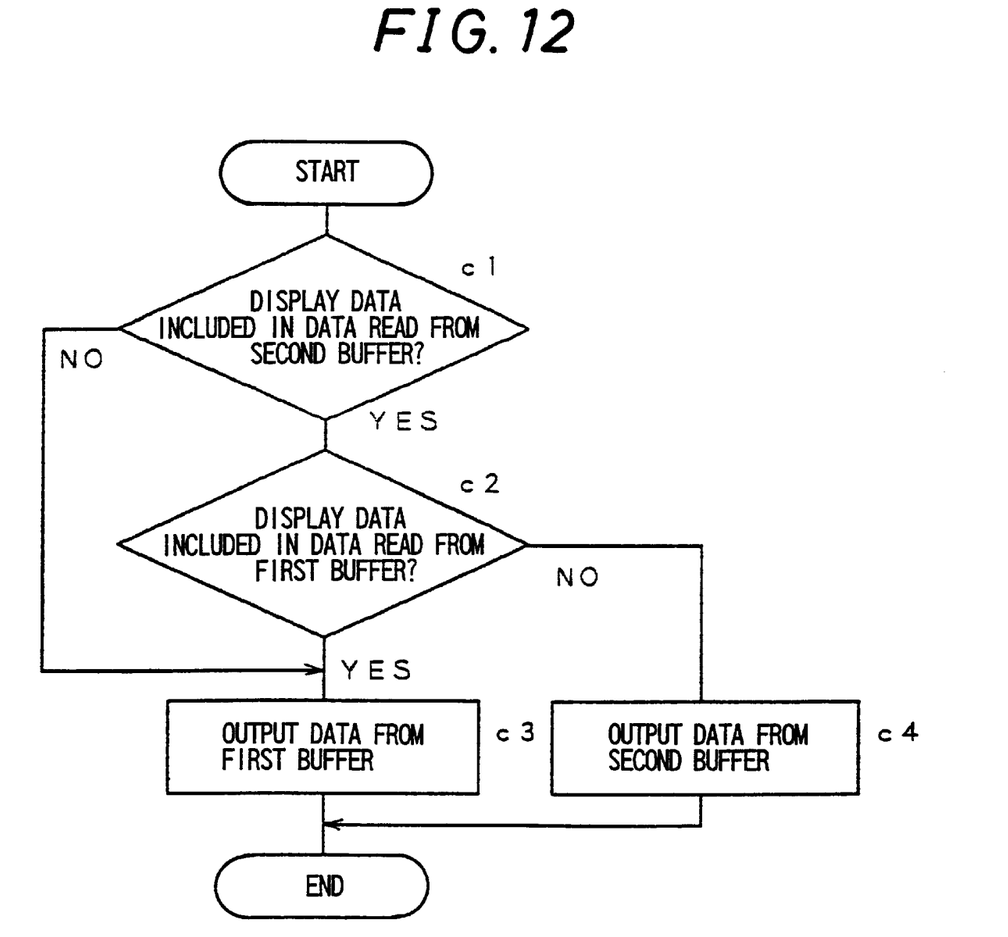
FIG. 12 is a flow chart indicating an operation of an AND circuit 46 provided in a synthesizer 45 in detail.

FIG. 12 is a flow chart indicating an operation of the AND circuit 46 of the synthesizer 45 in detail. In step c1, it is judged whether or not the data read from the second storage buffer 44 includes the data to be displayed, that is, the second figure data. If judged YES, control goes to step c2. If judged NO, control goes to step c3 where the data read from the first storage buffer 43 is outputted. In step c2, it is judged whether or not the data read from the first storage buffer 43 includes the data to be displayed, that is, the first figure data. If judged YES, control goes to step c3 to output the data read from the first storage buffer 43. The data read from the second storage buffer 44 is not outputted at this time. If judged NO in step c2, control goes to step c4 to output the data read from second storage buffer 44.

According to the contour line display apparatus 1 as described above, it is possible to draw contour lines according to display points of specific coordinates if the coordinates are specified in the rectangular coordinate system set up for the display face 2a of the liquid crystal display unit 2 using the tablet 6. Consequently, if a hand-written graphic character of a letter, a figure, etc. is entered, for example, the hand-written graphic character is contoured and displayed immediately. In addition, it is possible to confirm contour lines during the contouring processing. The convenience of the apparatus is thus improved significantly.

In addition to the contour line display apparatus 1, a method for displaying contour lines of a figure is also included in the range of the present invention. Furthermore, a floppy disk 23, that is, a medium storing a control program of the contour line display apparatus 1 is also included in the range of the present invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An apparatus for displaying contour lines of an input figure comprising:
    a displaying device having a display face for which a predetermined rectangular coordinate system is set up;
    an inputting device for specifying coordinates of the input figure in the rectangular coordinate system of the displaying device to output coordinate data;
    a contour data creating circuit for accumulating and fetching coordinate data outputted from the inputting device from a time of beginning of output to create contour data representing contour lines which enclose the figure composed of the coordinate data, on the basis of the accumulated coordinate data; and
    wherein the contour lines of the figure, including the contour data, are displayed on the displaying device.

2. The apparatus for displaying contour lines of an input figure of claim 1, wherein the contour data creating circuit includes:
    a first figure generating circuit for generating first figure data composed of the accumulated coordinate data;
    a first storing circuit for storing the first figure data;
    a second figure generating circuit for generating second figure data including the first figure data and representing a second figure which encloses the first figure;
    a second storing circuit for storing the second figure data; and
    a synthesizing circuit for synthesizing contour data obtained by removing the first figure data from the second figure data.

3. A method for displaying contour lines of an input figure, comprising the steps of:
    specifying coordinates of the figure in a predetermined rectangular coordinate system set up for a display face of a displaying device to output coordinate data of the specified coordinates of the figure;
    accumulating the output coordinate data from a time of beginning of output and creating contour data representing a contour line which encloses the figure composed of the coordinate data, on the basis of the coordinate data; and
    displaying the contour line composed of the contour data.

4. The method for displaying contour lines of an input figure of claim 3, wherein the step for creating contour data includes the steps of:
    generating and storing first figure data composed of the accumulated coordinate data;
    generating and storing second figure data including the first figure data and representing a second figure which encloses the first figure; and
    removing the first figure data from the second figure data to synthesize contour data.

5. A medium storing a program for controlling a contour line display apparatus by a computer, the program comprising:
    specifying coordinates in a predetermined rectangular coordinate system set up for the display face of the displaying device thereby to output the coordinate data;
    accumulating the outputted coordinate data from a time of the beginning of the output;
    creating contour data representing a contour line which encloses the figure composed of the coordinate data on the basis of the coordinate data; and
    displaying the contour line composed of the contour data on the displaying device.

6. The medium storing a program for controlling a contour line display apparatus of claim 5, wherein the control program generates and stores first figure data composed of the accumulated coordinate data, then generates and stores second figure data including the first figure data and representing a second figure which encloses a first figure composed of the first figure data, and removes the first figure data from the second figure data thereby to synthesize contour data, by a computer.

7. An apparatus for displaying contour lines of a figure input via an input device, the apparatus for displaying contour lines comprising:
    a display;
    an input device including a pointing device for specifying coordinates of the figure to be input via a coordinate system;
    a contour creating circuit for receiving data input via the input device relating to the figure and creating at least one contour line or lines which at least partially enclose the figure, the contour line or lines being created at least partially based upon said data input via the input device; and
    wherein the contour line or lines of the figure are displayed on the display.

8. A method of displaying contour lines of a figure, the method comprising the steps of:
    providing a display;
    using a pointer of an input device to specify coordinates of the figure which is input;

receiving the coordinates and creating at least one contour line which at least partially encloses the figure, the at least one contour line being created at least partially based upon the received coordinates; and displaying the at least one contour line on the display.

9. The method of claim 8, further comprising the steps of:

generating first figure data using coordinates of the figure input via the input device, storing the first figure data;

generating and storing the second figure data including the first figure data as well as the at least one contour line which at least partially encloses the figure; and removing the first figure data from the second figure data.

* * * * *